(12) United States Patent
Bergsten et al.

(10) Patent No.: US 6,497,086 B2
(45) Date of Patent: Dec. 24, 2002

(54) ROTARY CUTTING DESK CORNER SUSPENSION

(75) Inventors: Rex R. Bergsten, Burnsville, MN (US); Michael N. Zenner, Lakeville, MN (US)

(73) Assignee: The Toro Company, Minneapolis, MI (US)

(*) Notice: Subject to any disclaimer, the term of this patent is extended or adjusted under 35 U.S.C. 154(b) by 0 days.

(21) Appl. No.: 09/782,726

(22) Filed: Feb. 13, 2001

(65) Prior Publication Data

US 2002/0108363 A1 Aug. 15, 2002

(51) Int. Cl.[7] .............................................. A01D 34/66
(52) U.S. Cl. ......................................... 56/15.8; 56/14.7
(58) Field of Search ..................... 56/149, 15.7, 15.8, 56/14.7, 15.6, 15.9, 17.1, 17.5, 13.6, 13.5, 13.7, 6, 320.1, DIG. 14, DIG. 22, DIG. 16

(56) References Cited

U.S. PATENT DOCUMENTS

| | | | | |
|---|---|---|---|---|
| 3,154,903 A | * | 11/1964 | Smith | 56/15.8 |
| 4,316,356 A | * | 2/1982 | Planeta | 56/16.2 |
| 4,325,211 A | * | 4/1982 | Witt et al. | 56/15.8 |
| 4,835,951 A | * | 6/1989 | Walker | 56/16.6 |
| 5,515,669 A | * | 5/1996 | Schick et al. | 280/32.7 |

FOREIGN PATENT DOCUMENTS

GB 1205583 9/1970

* cited by examiner

Primary Examiner—Robert E. Pezzuto
Assistant Examiner—Meredith C Petravick
(74) Attorney, Agent, or Firm—James W. Miller

(57) ABSTRACT

A rotary cutting deck for a mower includes a cutting deck supported by wheels at three of the four corners of the deck. The other corner of the cutting deck, namely a corner of the deck that is close to the mower, is supported by a corner suspension that lifts upwardly with a biasing force sufficient to elevate that corner of the deck above the ground. This corner suspension takes the place of the caster wheel that would normally support this corner of the deck, and thus permits the deck to be moved closer to the side of the mower, thus reducing overall mower width without decreasing the width of the cutting swath.

17 Claims, 3 Drawing Sheets

ROTARY CUTTING DESK CORNER SUSPENSION

TECHNICAL FIELD

This invention relates to a rotary cutting deck for a mower. More particularly, this invention relates to a suspension for elevating at least one corner of the cutting deck above the ground, thereby eliminating the need for a wheel to support that corner of the cutting deck.

BACKGROUND OF THE INVENTION

Mowers are known for mowing large areas of grass, such as those in parks, golf courses, athletic fields, and the like. Many such mowers comprise a self-propelled traction frame that is part of a vehicle on which the operator sits as the mower is operated. At least one cutting deck, and often a plurality of cutting decks, are attached to the traction frame to cut a swath of grass as the traction frame moves forwardly. In a typical configuration, such a mower often has a front cutting deck extending forwardly of the traction frame and two side or wing cutting decks extending laterally from the sides of the traction frame.

The cutting decks are normally equipped with ground engaging wheels to allow the cutting decks to roll over the ground as the traction frame moves forwardly. A lift arm extends between the traction frame of the mower and the cutting deck to allow the cutting deck to be selectively lifted off the ground and placed in a transport position. In the case of the wing decks, the transport position comprises one in which the wing decks are folded up against the sides of the traction frame. When the cutting decks are not so lifted off the ground and placed in their transport position, they roll over the ground and "float" relative to the traction frame to allow the cutting decks to follow the ground contours.

In some prior art designs, the wing decks on such a mower are supported by a pair of outrigger wheels attached to the wing deck adjacent the outer front and rear corners of the wing deck. The inner front and rear corners of the wing deck carry no wheels at all. Instead, whatever support is provided from The traction frame, such as the lift arm, is used to keep the inner front and rear corners of the wing deck elevated above the ground. U.S. Pat. No. 5,715,667 to Goman et al. shows wing decks of this type, i.e. wing decks supported by only a pair of outrigger wheels on the outer corners of the frame and a support arm extending from the traction frame.

In decks of the type just described, the Applicants have found that using just a single pair of outrigger wheels on the outside of the wing deck presents problems in achieving a consistently good quality of cut. It should be kept in mind that such wing decks often cut over hilly, uneven terrain in which the wing deck rolls about a longitudinal axis through the wing deck. The Applicants have found that when cutting over this type of terrain, the lack of inner support wheels results in a variation in the height of cut over the width of the path being cut by the wing deck. In other words, the grass cut over the inside of the cutting deck might be cut higher or lower than the grass being cut over the outside of the cutting deck where the support wheels provide a more consistent height of cut. Since this variation in the height of cut can often be seen with the naked eye and detracts from the appearance of the cut grass, it is a disadvantage and desirably should be avoided.

Some mowers are known in which the wing deck is supported by wheels adjacent all the corners of the deck. The Applicants have found that this avoids the height of cut variation described above when only a pair of support wheels are used. However, using four support wheels adjacent each corner of the deck has problems of its own.

First, at least some of the support wheels are typically caster wheels, i.e. wheels capable of pivoting about a vertical support axis as they roll over the ground. Because of the varied and uneven terrain over which the mower operates, all of the support wheels, and particularly the caster wheels, wear quickly and must be periodically replaced. This is a disadvantage.

Moreover, it is desirable that a particular mower be as narrow as possible when the mower has the cutting decks placed in their transport position with the wing decks folded up along the sides of the mower. By minimizing the width of the mower in its transport configuration, the mower is more maneuverable and also fits within as tight a space as possible. This requires that the wing decks be close to the traction frame. When caster wheels are used on the inner corners of the wing decks, these caster wheels may be too close to the frame to avoid interfering with the frame. Thus, the wing deck must typically be moved out from the frame a little further than the designer might prefer in order to accommodate the inner caster wheels. Again, this also is a disadvantage.

SUMMARY OF THE INVENTION

One aspect of this invention relates to a rotary cutting deck for a mower. The cutting deck has at least one rotary cutting element rotating about a substantially vertical axis in a substantially horizontal cutting plane when the cutting deck and rotary cutting element are in operation. The cutting deck when coupled to the mower has two corners that are closest to the mower and two corners that are furthest from the mower. A plurality of spaced support wheels are carried adjacent at least the two corners of the cutting deck that are furthest from the mower. A corner suspension is connected to at least one of the two corners of the deck that are closest to the mower. The corner suspension comprises at least one upwardly biased connecting link attached to the at least one corner of the cutting deck, the bias on the connecting link being sufficient to elevate the at least one corner of the cutting deck above the ground without using a support wheel adjacent the at least one corner.

Another aspect of this invention relates to a rotary cutting deck for a mower. The cutting deck has at least one rotary cutting element rotating about a substantially vertical axis in a substantially horizontal cutting plane when the cutting deck and rotary cutting element are in operation. An attachment is provided on the cutting deck for coupling to a pivotal lift arm extending laterally outwardly from one side of the mower. The cutting deck when so coupled to the lift arm has inner front and rear corners that are closest to the mower and outer front and rear corners that are furthest from the mower. Three support wheels are carried adjacent the inner front, the outer front and the outer rear corners of the cutting deck. A corner suspension comprises at least one upwardly biased connecting link attached to the inner rear corner of the cutting deck. The bias on the connecting link is sufficient to elevate the inner rear corner of the cutting deck above the ground without using a support wheel on the inner rear corner.

Yet another aspect of this invention relates to a rotary cutting deck for a mower. The cutting deck has four corners. Ground engaging wheels are located adjacent three of the four corners of the deck. A corner suspension is provided for the fourth corner of the deck. The corner suspension includes an upwardly biased connecting link acting between the mower and the fourth corner of the deck. The connecting link is biased to lift upwardly on the fourth corner of the deck with a biasing force sufficiently strong to elevate the fourth corner of the deck above the ground. The corner suspension takes the place of a ground engaging wheel on the fourth corner of the deck.

BRIEF DESCRIPTION OF THE DRAWINGS

This invention will be described hereafter in the Detailed Description, taken in conjunction with the following drawings, in which like reference numerals refer to like elements or parts throughout.

DETAILED DESCRIPTION

Figure 1:
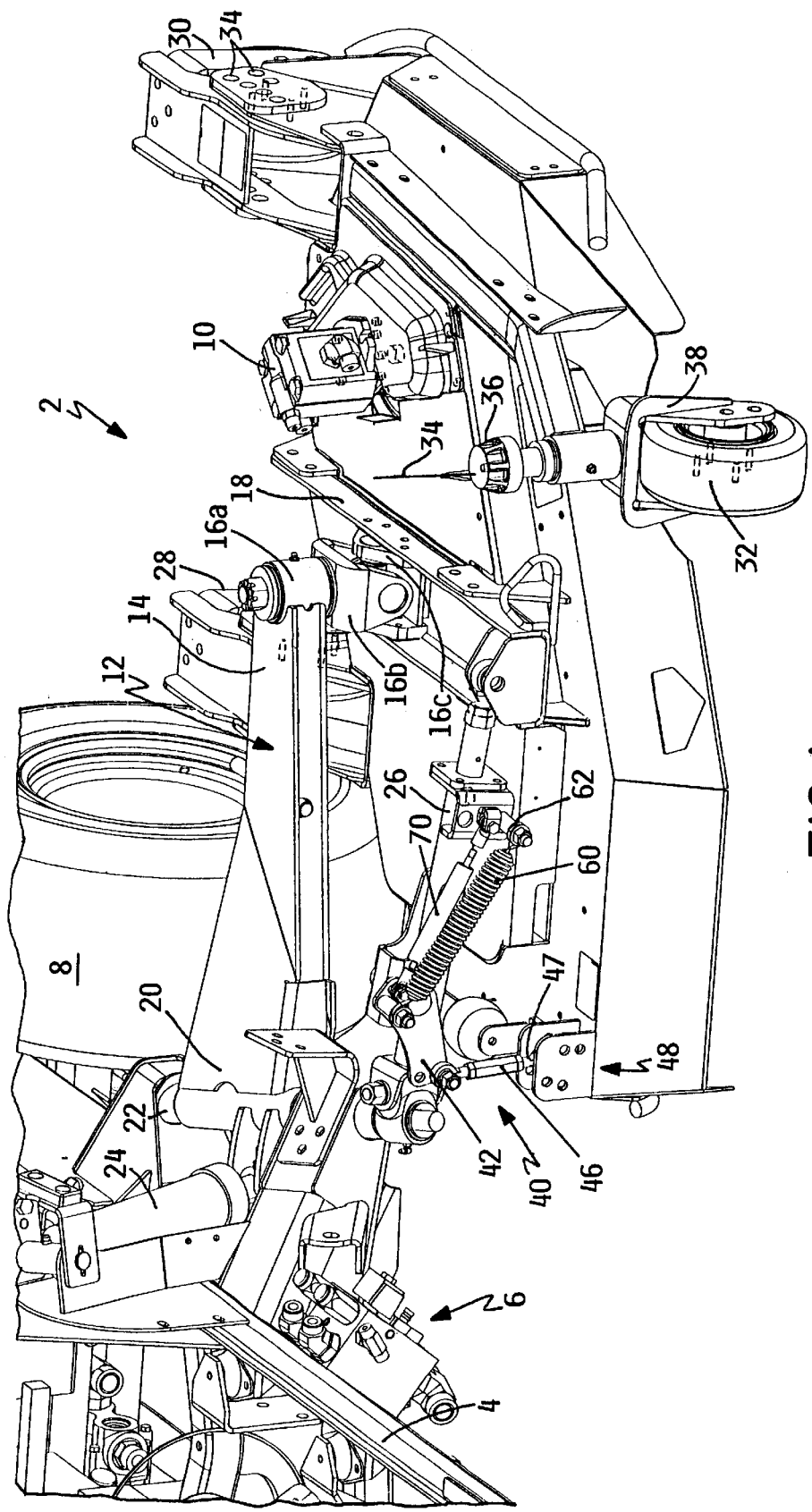
FIG. 1 is a perspective view of a rotary cutting deck according to this invention, particularly illustrating the deck installed as a wing deck extending laterally to one side of the traction frame of a mower.
Figure 2:
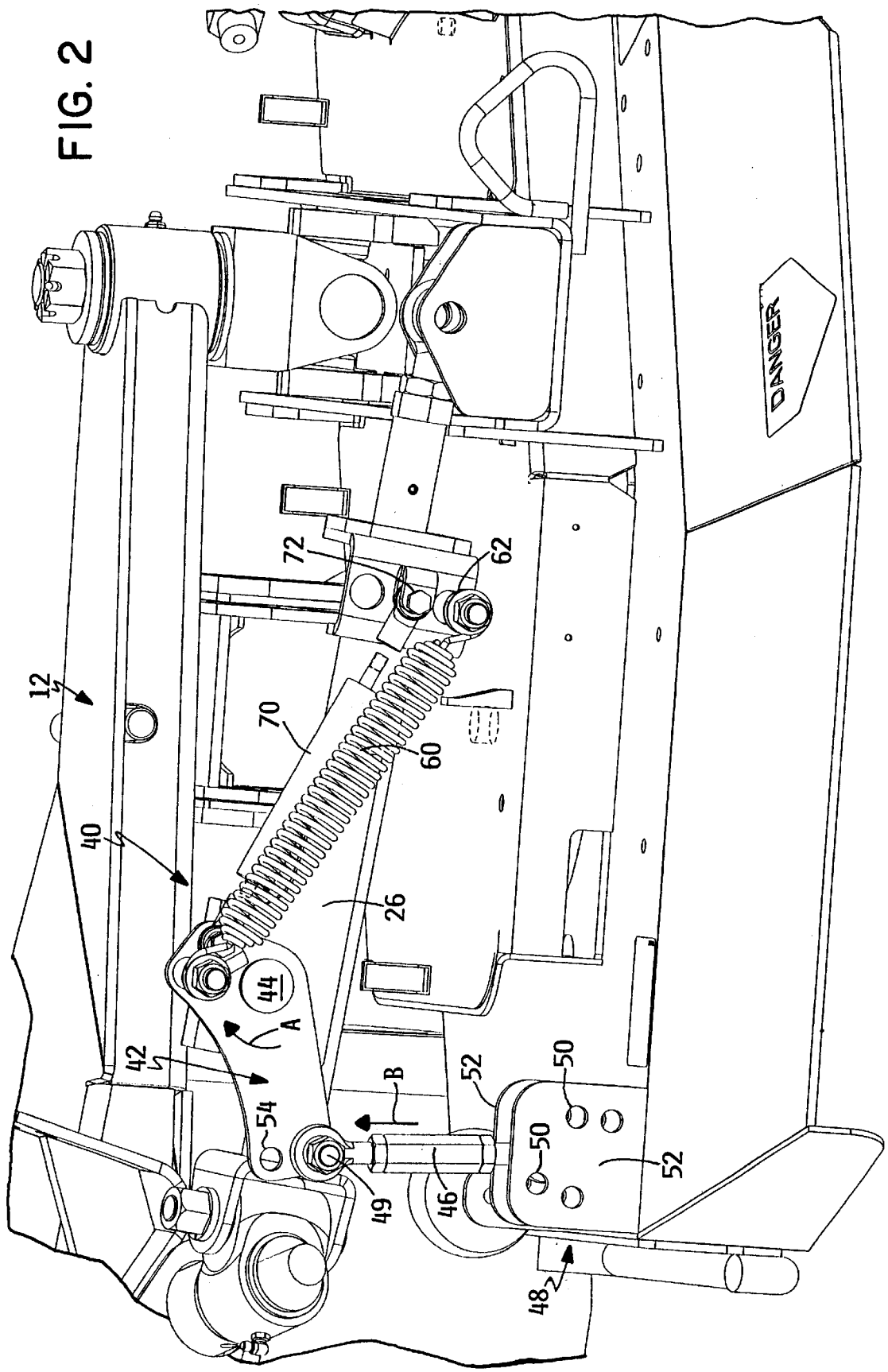
FIG. 2 is an enlarged perspective view of a portion of the rotary cutting deck of FIG. 1, particularly illustrating the corner suspension for elevating one corner of the cutting deck in lieu of a support wheel.
Figure 3:
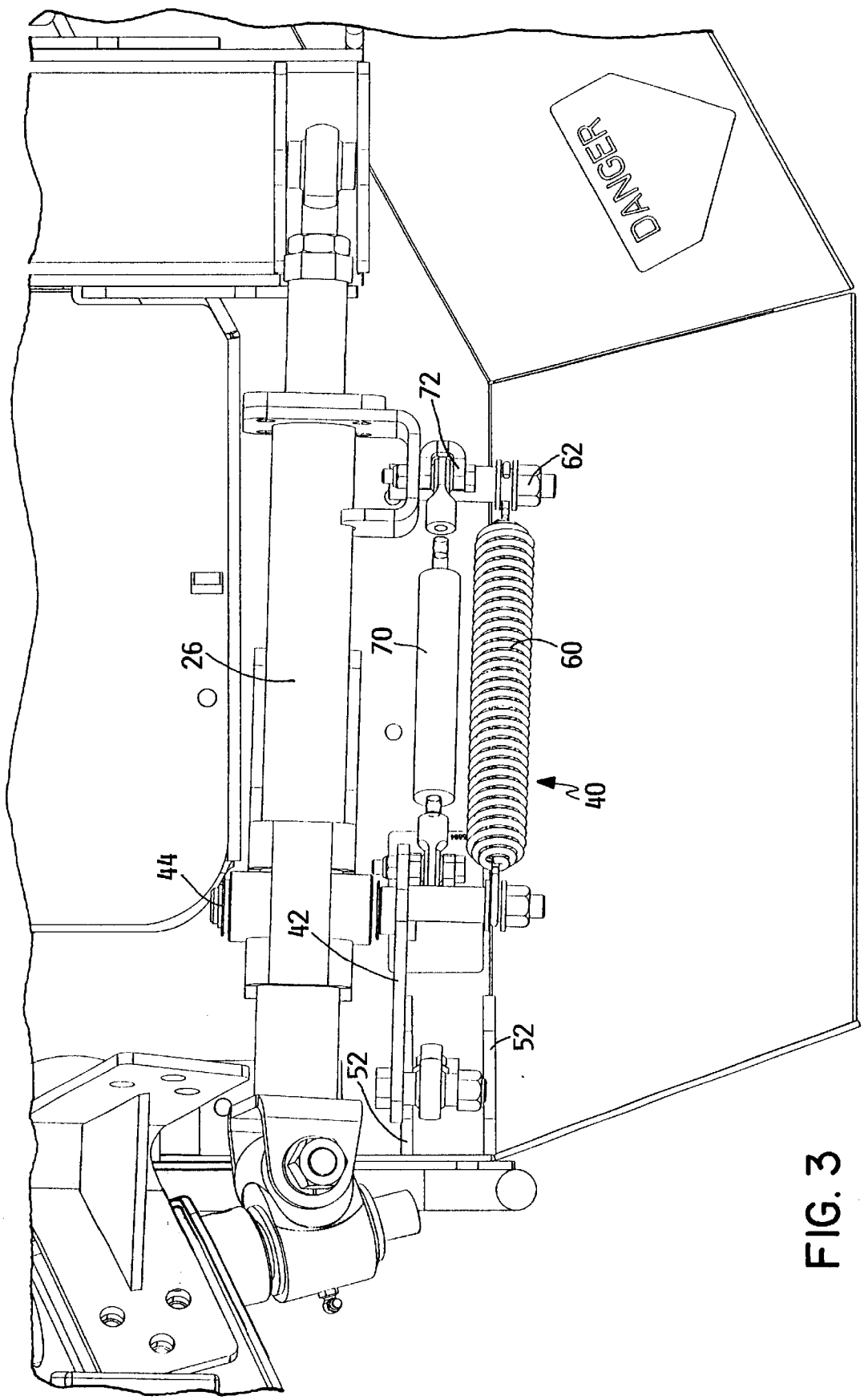
FIG. 3 is an enlarged top plan view of a portion of the rotary cutting deck of FIG. 1, particularly illustrating the corner suspension for elevating one corner of the cutting deck.

One embodiment of a rotary cutting deck according to this invention is shown in FIGS. 1–3 with the rotary cutting deck being generally illustrated as 2. Cutting deck 2 is of the type that is intended to be attached to a traction frame 4 of a mower 6 so that cutting deck 2 is propelled over the ground as mower 6 travels over the ground. One cutting deck 2 or multiple cutting decks 2 may be attached to mower 6. Only a portion of mower 6 is shown in FIG. 1, namely a portion of traction frame 4 and one of the front drive wheels 8 of mower 6.

Cutting deck 2 houses or carries one or more rotary cutting elements (not shown), such as rigid blades, that rotate in substantially horizontal cutting planes about substantially vertical axes. A hydraulic motor 10 may be mounted on top of cutting deck 2 for providing power for rotating the cutting elements carried within a cutting chamber on the underside of cutting deck 2. Other power sources for rotating the cutting elements can be used.

Cutting deck 2 is shown as a wing deck attached to one side of traction frame 4 of mower 6. As is well known in the art, a lift arm 12 attaches cutting deck 2 to traction frame 4. An outer end 14 of lift arm 12 is pivotally coupled to an attachment 18 at the approximate center of cutting deck 2 by various pivot joints 16a, 16b, and 16c that permit pitching, rolling, and yawing of cutting deck 2 about the three x, y and z axes of an xyz coordinate system. Instead of the separate pivot joints 16a–16c shown, a single ball joint could be used to provide the same motion for cutting deck 2. An inner end 20 of lift arm 12 is connected to traction frame 4 by a pivot shaft 22.

A hydraulic cylinder 24 is provided on traction frame 4 for selective operation by the operator of mower 6. This cylinder is connected between traction frame 4 and inner end 20 of lift arm 12 to pivot lift arm 12 upwardly and downwardly about pivot shaft 22. This will raise and lower cutting deck 2 between its substantially horizontal cutting position (shown in FIG. 1) and a raised generally upright transport position (not shown) in which cutting deck 2 has been folded up along the side of traction frame 4. Thus, lift arm 12 is used for moving traction frame 4 between its operating and its transport positions. Lift arm 12 also serves to propel cutting deck 2 as traction frame 4 of mower 6 is driven over the ground.

In addition to lift arm 12, a second support arm 26 extends between traction frame 4 and a rear portion of cutting deck 2. This second support arm comprises a shock absorber for bi-directionally absorbing impact shocks and resisting the yawing action of cutting deck 2 about the vertical pivot axis. The details of the shock absorber comprising the second support arm 26 are, inter alia, the subject of another patent application assigned to the assignee of this invention, namely U.S. Ser. No. 09/507,313, which is copending herewith.

Referring to FIG. 1, cutting deck 2 has three support wheels adjacent three corners of cutting deck 2. There is an inner front support wheel 28 adjacent the inner front corner of cutting deck 2, and outer front support wheel 30 adjacent the outer front corner of cutting deck 2, and an outer rear support wheel 32 adjacent the outer rear corner of cutting deck 2. The two front support wheels 28 and 30 are not caster wheels but are rotatable support wheels that rotate about pivot shafts that do not themselves rotate about vertical axes. The outer rear support wheel 32 comprises a caster wheel that is capable of rotating about a substantially vertical pivot axis 34.

Each of the support wheels 28, 30 and 32 can be adjusted relative to cutting deck 2 to change the height of cut. This is done in generally conventional ways known in the art. For example, the front support wheels 28 and 30 can be adjusted up and down by virtue of various support pins received in one of a plurality of adjustment holes 34 provided on the height of cut mechanism. The rear caster wheel is provided with a rotatable adjustment knob 36 which, when rotated, raises and lowers the yoke 38 that supports the rear caster wheel. The precise type of height adjustment mechanism used in conjunction with the support wheels can be varied.

A corner suspension is provided for the remaining corner of cutting deck 2 to keep this corner elevated above the ground during operation of cutting deck 2 without having to use a support wheel at that corner. The corner suspension is indicated generally as 40 in FIGS. 1–3. Corner suspension 40 acts on the inner rear corner of cutting deck 2.

As shown in FIGS. 1–3, corner suspension 40 acts between cutting deck 2 and a portion of second support arm 26 that overlies cutting deck 2. Since second support arm 26 is pivotally connected at either end to cutting deck 2 and traction frame 4, second support arm 26 will move up and down with cutting deck 2 as cutting deck 2 floats and follows the ground contours. By locating corner suspension 40 on that portion of second support arm 26 overlying cutting deck 2, the location and placement of corner suspension 40 is simplified with corner suspension 40 also moving generally in concert with cutting deck 2.

Corner suspension 40 comprises a bellcrank 42 that is pivotally mounted on a pivot rod 44 that is carried on second support arm 26. A generally vertical connecting link 46 extends between one arm of bellcrank 42 and the inner rear corner of cutting deck 2. The lower end 47 of connecting link 46 is connected to the inner rear corner of cutting deck 2 through a height adjustment mechanism 48. Namely, lower end 47 of connecting link 46 can be pinned in one of a plurality of vertically spaced adjustment holes 50 provided on height adjustment brackets 52 carried on the inner rear corner of cutting deck 2. In addition, the upper end 49 of connecting link 46 can be connected to one of a plurality of vertically spaced holes 54 provided on the first arm of bellcrank 42, to further increase the number of height adjustment settings that are possible.

Height adjustment mechanism 48 between the inner rear corner of cutting deck 2 and connecting link 46 can obviously be varied. For example, the use of plural adjustment holes 54 on the first arm of bellcrank 42 can be deleted with the upper end 49 of connecting link 46 simply pinned to the first arm of bellcrank 42 in only one location. Secondly, connecting link 46 has its lower end 47 shown located between two height adjustment brackets 52 with its lower end 47 being pinned to both brackets. However, only one height adjustment bracket 52 could be used in place of the two brackets 52 that are shown. In addition, other height adjustment mechanisms for connecting lower end 47 of connecting link 46 to cutting deck 2 could be used.

The second arm of bellcrank 42 is connected to a spring 60 that extends between the second arm of bellcrank 42 and an anchor 62 that is located on second support arm 26. Spring 60 imposes a force tending to rotate bellcrank 42 in the direction of the arrow A. See FIG. 2. This force is thus arranged to pull up on connecting link 46, and thus to pull up on the inner rear corner of cutting deck 2, as shown by the arrow B adjacent connecting link 46. Again see FIG. 2. Spring 60 provides a biasing force which is chosen to be sufficient to keep the inner rear corner of cutting deck 2 elevated above the ground during normal cutting operation of cutting deck 2. This force also helps keep the three support wheels 28, 30 and 32 in contact with the ground.

Using a resilient spring force to impose a load on the inner rear corner of cutting deck 2 elevates that corner of cutting deck 2 without having to use any support wheel on that corner. Thus, the caster wheel that would normally be found on that corner of cutting deck 2 can simply be deleted. This is advantageous since there is one less caster wheel that sees wear and would eventually have to be replaced. It also allows cutting deck 2 to be spaced more closely to frame 4 with no interference occurring between the caster wheel and the side of traction frame 4 when cutting deck 2 is folded up into its transport position. Accordingly, the transverse width of mower 6 can be minimized when the cutting decks 2 are raised and mower 6 is in its transport mode.

The Applicants have found that the above-described corner suspension 40 effectively supports the inner rear corner of cutting deck 2 without the need for any support wheel. This corner suspension 40, in concert with the other three support wheels 28, 30 and 32, allows cutting deck 2 to float and adjust to ground contours and provides an even and consistent height of cut over that swath of grass being cut by cutting deck 2. Since all of the support wheels 28, 30 and 32 are desirably equipped with height of cut adjustment mechanisms, it is necessary for corner suspension 40 to also have this ability, which has been implemented by having lower end 47 of connecting link 46 connect to cutting deck 2 through a height of cut adjustment mechanism 48.

In some operational conditions, it has been found that the inner rear corner of cutting deck 2 bounces up and down during operation. In order to minimize this undesired bouncing, an oil filled damper 70 is used between the second arm of bellcrank 42 and another anchor 72 on second support arm 26. This damper 70 tends to smooth out and eliminate undesirable bouncing of cutting deck 2. However, damper 70 could be eliminated if so desired and corner suspension 40 including spring 60 would still be useful for elevating the inner rear corner of cutting deck 2 without using a support wheel.

Various modifications of this invention will be apparent to those skilled in the art. While corner suspension 40 has been shown as being applied to only the inner rear corner of cutting deck 2, a similar corner suspension could also be used on the inner front corner of cutting deck 2 in place of inner front support wheel 28. Thus, the scope of this invention is to be limited only by the appended claims.

We claim:

1. A rotary cutting deck for a mower, which comprises:

(a) a cutting deck having at least one rotary cutting element rotating about a substantially vertical axis in a substantially horizontal cutting plane when the cutting deck and rotary cutting element are in operation, the cutting deck when coupled to the mower having two corners that are closest to the mower and two corners that are furthest from the mower;

(b) a plurality of spaced support wheels carried adjacent at least the two corners of the cutting deck that are furthest from the mower; and (c) a corner suspension connected to at least one of the two corners of the deck that are closest to the mower, wherein the corner suspension comprises at least one upwardly biased connecting link attached to the at least one corner of the cutting deck, the bias on the connecting link being sufficient to elevate the at least one corner of the cutting deck above the ground without using a support wheel adjacent the at least one corner, wherein the connecting link extends substantially vertically and has a lower end and an upper end, wherein the lower end of the connecting link is connected to the cutting deck, wherein the upper end of the connecting link is connected to a spring, and wherein the spring acts between the connecting link and a support arm extending between the mower and the cutting deck, the support arm being pivotally connected at opposite ends to the mower and to the cutting deck.

2. The cutting deck of claim 1, further including a pivotal lift arm extending between the mower and the cutting deck for lifting the mower between a lowered operating position and a raised transport position, wherein the support arm is a second support arm that is other than the pivotal lift arm.

3. The cutting deck of claim 1, wherein the corner suspension includes a bellcrank pivotally carried on the support arm with the bellcrank having first and second arms, wherein the upper end of the connecting link is connected to the first arm of the bellcrank and the spring has one end thereof connected to the second arm of the bellcrank.

4. The cutting deck of claim 3, wherein the spring has a second end anchored on the support arm.

5. The cutting deck of claim 1, wherein the support arm has a portion which overlies the cutting deck and is adjacent to the at least one corner of the cutting deck having the corner suspension.

6. The cutting deck of claim 5, wherein the corner suspension is connected to the overlying portion of the support arm.

7. The cutting deck of claim 1, further including a damper acting between the connecting link and the support arm for reducing bouncing of the cutting deck.

8. The cutting deck of claim 7, wherein the damper comprises an oil filled cylinder.

9. The cutting deck of claim 1, wherein the corner suspension is provided on only one of the two corners of the cutting deck closest to the mower, the other of the two corners of the cutting deck closest to the mower carrying a support wheel.

10. A rotary cutting deck for a mower, which comprises:
(a) a cutting deck having at least one rotary cutting element rotating about a substantially vertical axis in a substantially horizontal cutting plane when the cutting deck and rotary cutting element are in operation;
(b) an attachment on the cutting deck for coupling to a pivotal lift arm extending laterally outwardly from one side of the mower, the cutting deck when so coupled to the lift arm having inner front and rear corners that are closest to the mower and outer front and rear corners that are furthest from the mower;
(c) three support wheels carried adjacent one of the inner corners, the outer front corner and the outer rear corner of the cutting deck, respectively; and
(d) a corner suspension comprising at least one upwardly biased connecting link attached to the other inner corner of the cutting deck, the bias on the connecting link being sufficient to elevate the other inner corner of the cutting deck above the ground without using a support wheel on the other inner corner, wherein the corner suspension includes a pivotal bellcrank having first and second arms, and wherein one end of the connecting link is connected to the first arm of the bellcrank and a spring has one end thereof connected to the second arm of the bellcrank, the spring providing the upward biasing force for the connecting link.

11. The cutting deck of claim 10, wherein the one inner corner that carries one of the support wheels is the inner front corner and the other inner corner that carries the corner suspension is the inner rear corner, and wherein the support wheel for the outer rear corner of the cutting deck comprises a caster wheel.

12. The cutting deck of claim 10, further including a damper acting on the connecting link for reducing bouncing of the cutting deck.

13. The cutting deck of claim 10, further including a support arm extending between the mower and the cutting deck with a portion of the support arm overlying the cutting deck and being adjacent the other inner corner of the cutting deck, wherein the connecting link, bellcrank and spring all overlie the connecting deck with the bellcrank being pivotally carried on the support arm and the spring being anchored an the support arm.

14. The cutting deck of claim 13, wherein the support arm is other than the pivotal lift arm.

15. A rotary cutting deck for a mower having a pivotal lift arm for lifting and lowering the cutting deck into and out of engagement with the ground, which comprises:
(a) a cutting deck having four corners, the cutting deck having an attachment for coupling to an outer end of the pivotal lift arm of the mower, the attachment being configured to pivotally connect the cutting deck to the lift arm to permit the cutting deck to pivot relative to the lift arm to follow ground contours, and wherein the attachment is located in a central portion of the cutting deck between the four corners of the cutting deck such that the four corners of the cutting deck rise and fall relative to the ground as the cutting deck follows uneven ground contours;
(b) ground engaging wheels adjacent three of the four corners of the deck which wheels are adapted to roll over the ground and follow the ground contours; and
(c) a corner suspension for the fourth corner of the deck, the corner suspension including an upwardly biased connecting link acting between the mower and the fourth corner of the deck, the connecting link being biased to lift upwardly on the fourth corner of the deck with a biasing force sufficiently strong to elevate the fourth corner of the deck above the ground and to help keep the ground engaging wheels on the other corners of the deck in contact with the ground, the corner suspension taking the place of a ground engaging wheel on the fourth corner of the deck.

16. The cutting deck of claim 15, further including a damper acting on the connecting link for reducing bouncing of the cutting deck.

17. The cutting deck of claim 15, wherein the attachment is located at the approximate center of the cutting deck.

* * * * *

UNITED STATES PATENT AND TRADEMARK OFFICE
CERTIFICATE OF CORRECTION

PATENT NO.    : 6,497,086 B2
DATED         : December 24, 2002
INVENTOR(S)   : Rex R. Bergsten et al.

It is certified that error appears in the above-identified patent and that said Letters Patent is hereby corrected as shown below:

<u>Title page,</u>
Item [54], Title, change "DESK" to -- DECK --

Signed and Sealed this

First Day of July, 2003

JAMES E. ROGAN
*Director of the United States Patent and Trademark Office*